United States Patent
Fu

(10) Patent No.: US 12,312,239 B2
(45) Date of Patent: May 27, 2025

(54) DIELECTRIC INORGANIC COMPOSITION

(71) Applicant: OHARA INC., Kanagawa (JP)

(72) Inventor: Jie Fu, Kanagawa (JP)

(73) Assignee: OHARA INC., Kanagawa (JP)

( * ) Notice: Subject to any disclaimer, the term of this patent is extended or adjusted under 35 U.S.C. 154(b) by 903 days.

(21) Appl. No.: 17/601,929

(22) PCT Filed: Mar. 23, 2020

(86) PCT No.: PCT/JP2020/012652
§ 371 (c)(1),
(2) Date: Oct. 7, 2021

(87) PCT Pub. No.: WO2020/209039
PCT Pub. Date: Oct. 15, 2020

(65) Prior Publication Data
US 2022/0144640 A1   May 12, 2022

(30) Foreign Application Priority Data

Apr. 8, 2019 (JP) ................................. 2019-073336

(51) Int. Cl.
*C01B 25/37* (2006.01)
*H01G 4/12* (2006.01)
*H01G 4/30* (2006.01)

(52) U.S. Cl.
CPC ......... *C01B 25/372* (2013.01); *H01G 4/1254* (2013.01); *C01P 2002/72* (2013.01); *C01P 2006/40* (2013.01); *H01G 4/30* (2013.01)

(58) Field of Classification Search
CPC . C01B 25/372; H01G 4/1254; C01P 2002/72; C01P 2006/40
See application file for complete search history.

(56) References Cited

U.S. PATENT DOCUMENTS

| 4,405,477 A * | 9/1983 | Murase ................... C04B 35/47 |
| | | 252/62.3 BT |
| 2005/0217228 A1 | 10/2005 | Beall et al. |
| 2015/0124372 A1* | 5/2015 | Park ........................ H01G 4/30 |
| | | 361/301.4 |

FOREIGN PATENT DOCUMENTS

| JP | 2005187240 A | 7/2005 |
| JP | 2007261913 A | 10/2007 |

(Continued)

OTHER PUBLICATIONS

Tahalyani, Jitendra, et al. "Characteristics of capacitor: fundamental aspects." Handbook of Nanocomposite Supercapacitor Materials I: Characteristics (2020): 1-51. (Year: 2020).*

(Continued)

*Primary Examiner* — Bryan D. Ripa
*Assistant Examiner* — Cameron K Miller
(74) *Attorney, Agent, or Firm* — Li & Cai Intellectual Property Office

(57) ABSTRACT

Provided is a dielectric body having a high dielectric constant and a change rate of the dielectric constant of 30% or less, in a temperature range from −50° C. to 350° C. An inorganic substance contains an oxide crystal including A and M (the A being one or more of P, Ge, and V, and the M being one or more of Nb and Ta), in which the dielectric constant is 500 or more. In the inorganic substance, the oxide crystal is one or more of $PNb_9O_{25}$, $P_{2.5}Nb_{18}O_{50}$, $GeNb_9O_{25}$, $GeNb_{18}O_{47}$, $GeNb_{19.144}O_{50}$, $VNb_9O_{25}$, $VNb_9O_{24.9}$, $PTa_9O_{25}$, $GeTa_9O_{25}$, $VTa_9O_{25}$, and solid solutions thereof.

6 Claims, 4 Drawing Sheets

(56) References Cited

FOREIGN PATENT DOCUMENTS

| JP | 2007531685 A | 11/2007 |
|---|---|---|
| JP | 201328478 A | 2/2013 |
| JP | 2017119607 A | 7/2017 |
| JP | 2017178744 A | 10/2017 |
| JP | 201973398 A | 5/2019 |
| WO | WO2018092637 A1 | 5/2018 |

OTHER PUBLICATIONS

Office Action issued on Dec. 12, 2023 for JP application No. 2020-517227.
WIPO, International Search Report issued on Oct. 15, 2020.
Patoux S et al., "A Reversible Lithium Intercalation Process in an Re03-Type Structure PNb9O5," Journal of the Electronchemical Society, 2002, vol. 149, No. 4, A391-A400, abstract, abstract.

* cited by examiner

DIELECTRIC INORGANIC COMPOSITION

FIELD OF THE DISCLOSURE

The present disclosure relates to an inorganic composition having properties allowing for its use as a dielectric body, more specifically, relates to an inorganic composition having a high dielectric constant and a small change rate of the dielectric constant in a temperature region from −50° C. to 350° C., and also relates to a dielectric body using the inorganic composition.

BACKGROUND OF THE DISCLOSURE

With the widespread use of electronic devices such as smartphones and tablets, there is a demand for downsizing electronic components used in such electronic devices and enhancing performance of the electronic components, and of course, multilayer ceramic capacitors (MLCCs) used as multilayer capacitors are also required to be downsized and to have a large capacity.

In recent years, with the widespread use of electric vehicles, in order to improve motor performance and make electric vehicles more compact, it is required to directly mount an electrical substrate in the vicinity of the motor with a high temperature. Therefore, with the increased temperature in the usage environment of vehicle-mounted electrical components, MLCCs are also required to have a high electrostatic capacity and good capacity temperature characteristics even at higher temperatures (from 200° C. to 350° C.). That is, it is required that the dielectric constant of a dielectric body included in a condensor is high even in a high temperature region exceeding 200° C., and the dielectric constant varies little with temperature.

Further, in recent years, there has been an increasing demand for condensors having a high energy storage density for use in excimer lasers, medical X-ray devices, power storage devices, power transmission equipment, and the like utilized in semiconductor processing and vision correction surgery. In order to obtain a high energy storage density for the dielectric body used in such condensors, the dielectric body needs to have both a high dielectric constant and high dielectric breakdown strength, and at the same time, to have the capacity varying little with temperature even at high temperatures.

However, $BaTiO_3$ often used as a dielectric body has a Curie temperature of about 130° C., and thus, in a temperature region of 150° C. or higher, the dielectric constant decreases strongly, resulting in the problem that the above-mentioned requirements are not satisfied.

Document 1 describes a composite of $BaTiO_3$ in which the Curie temperature can be raised and the capacity has good temperature characteristics at up to 200° C. However, there is a disadvantage in that this material has a dielectric constant of 500 or less and does not provide a large capacity.

Further, $KNbO_3$, $K_{0.5}Na_{0.5}NbO_3$, and the like have been studied as dielectric materials having a capacity with good temperature characteristics. However, there is a problem in that, in these dielectric materials, potassium (K) is scattered (sublimated) in a firing process, so that lattice defects occur in the obtained dielectric material, and thus, the insulating properties decrease. Here, if the insulating properties are low, semiconductor properties of the material increase and dielectric breakdown easily occurs. Therefore, when the above dielectric material is applied to a ceramic electronic component such as a condensor, there is a problem in that the reliability of the ceramic electronic component decreases. Additionally, due to the scattering of potassium (K), management of the production process is difficult, and thus, productivity is reduced.

PRIOR ART DOCUMENT

Patent Document

[Patent Document 1] Japanese Unexamined Patent Application Publication No. 2017-119607

SUMMARY OF THE DISCLOSURE

An object of the present disclosure is to solve the problems described above. That is, an object of the present disclosure is to provide a dielectric body having a high dielectric constant and stable temperature dependence even in a high temperature region.

As a result of diligent research to solve the above-described problems, the present inventors have found that, in an oxide crystal including A and M (the A being one or more of P, Ge, and V, and the M being one or more of Nb and Ta), if a ratio of the A and the M is in a range from 0.01 to 1.00, the dielectric constant is 500 or more, which led to the completion of the present disclosure.

The present disclosure corresponds to (1) to (6) below.
(1) An inorganic substance containing an oxide crystal including A and M (the A being one or more of P, Ge, and V, and the M being one or more of Nb and Ta), wherein a ratio of the A and the M is in a range from 0.01 to 1.00, and a dielectric constant is 500 or more.
(2) The inorganic substance according to (1) above, wherein a change rate of the dielectric constant relative to a temperature range from −50° C. to 350° C. is 30% or less.
(3) The inorganic substance according to (1) or (2), wherein the oxide crystal is one or more of $PNb_9O_{25}$, $P_{2.5}Nb_{18}O_{50}$ and $GeNb_9O_{25}$, $GeNb_{18}O_{47}$, $GeNb_{19.144}O_{50}$, $VNb_9O_{25}$, $VNb_9O_{24.9}$, $PTa_9O_{25}$, $GeTa_9O_{25}$, $VTa_9O_{25}$, and solid solutions thereof.
(4) A dielectric body including the inorganic substance according to any one of (1) to (3).
(5) The dielectric body according to (4), wherein the dielectric body is a ferroelectric body.
(6) A condensor including the dielectric body according to (4) or (5) above.

According to the present disclosure, it is possible to provide a dielectric body having a high dielectric constant and good temperature characteristics in a temperature range from −50 to 350° C., and a ceramic condensor containing the dielectric body.

DETAILED DESCRIPTION OF THE EXEMPLARY EMBODIMENTS

<Dielectric Body According to Present Disclosure>

Figure 1:
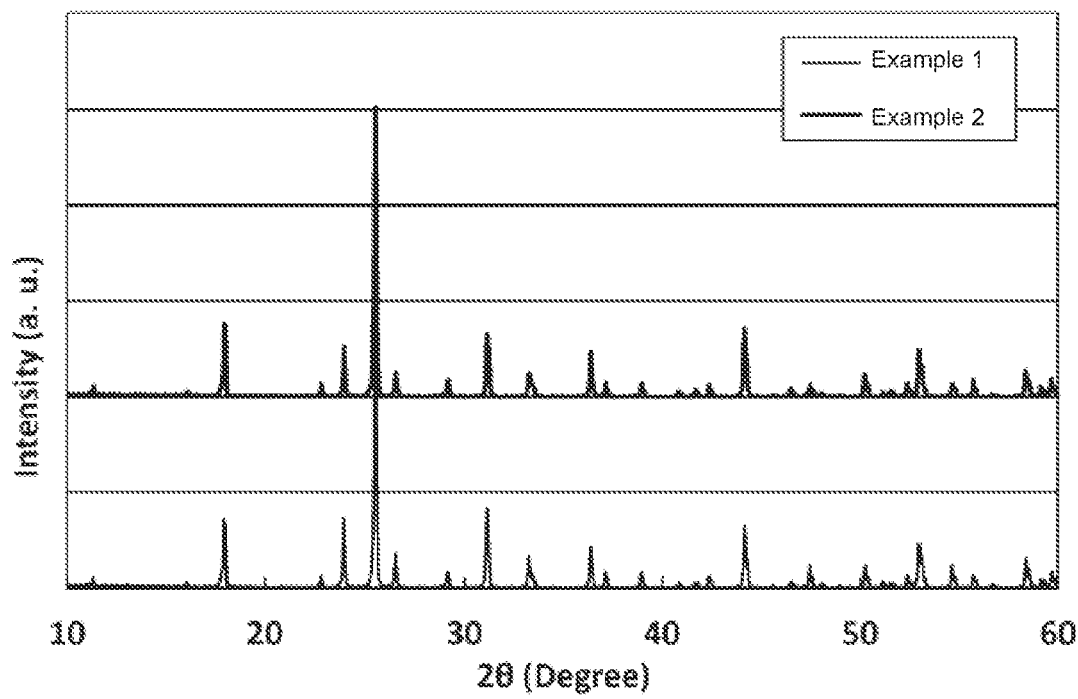
FIG. 1 is a graph showing XRD-patterns of Examples 1 and 2.

An inorganic composition according to the present disclosure will be described.

The inorganic composition according to the present disclosure is useful as a dielectric body, and is a ceramic containing oxide crystals including A and M (the A being one or more of P, Ge, and V, and the M being one or more of Nb and Ta). If a ratio of the A and the M is adjusted, it is possible to realize an inorganic composition having characteristics in which the dielectric constant is 500 or more and the dielectric constant varies little over a wide temperature range from −50 to 350° C. In order to obtain excellent dielectric properties, the ratio of the A and the M is preferably in a range from 0.01 to 1.00, more preferably in a range from 0.03 to 0.50, and most preferably in a range from 0.04 to 0.20. Among the oxide crystals including the A and the M, in particular, $PNb_9O_{25}$, $P_{2.5}Nb_{18}O_{50}$ and $GeNb_9O_{25}$, $GeNb_{18}O_{47}$, $GeNb_{19.144}O_{50}$, $VNb_9O_{25}$, $VNb_9O_{24.9}$, $PTa_9O_{25}$, $GeTa_9O_{25}$, $VTa_9O_{25}$, and solid solutions thereof have excellent characteristics and thus are preferably included in the inorganic composition.

In addition to the components mentioned above, for example, $SiO_2$, $GeO_2$, $B_2O_3$, $Al_2O_3$, $ZnO$, $Bi_2O_3$, $TiO_2$, $ZrO_2$, $V_2O_5$, $Ta_2O_5$, $WO_3$, alkali metal oxides, alkaline earth metal oxides, rare earth oxides, and transition metal oxides may be included in the inorganic composition according to the present disclosure. These components act as sintering aids and may exist alone, or may be dissolved as solid solutions in the above-mentioned crystals, or may form new crystals with the elements constituting the above-mentioned crystals. If these sintering aids are introduced, the firing temperature is lowered or a solid solution is formed, and thus, it is possible to improve the dielectric properties.

Glass may be added to the inorganic composition according to the present disclosure. Glass acts as a sintering aid and has an effect of lowering the firing temperature.

The inorganic composition according to the present disclosure can form a composite with other dielectric crystals, such as tungsten bronze type crystals, perovskite type crystals, $CaZrO_3$ crystals, $SrZrO_3$ crystals, $BaTi_2O_5$ crystals, and $CaTi_2O_5$ crystals. With a composite with these dielectric bodies, it may be possible to obtain dielectric properties as designed. Note that the above-mentioned tungsten bronze type crystals particularly preferably include one or more selected from the group consisting of $MNb_2O_6$(M: Ca, Sr, Ba), $M_2RNb_5O_{15}$ (M: Ca, Sr, Ba; R: Na, K), and $K_2LnNb_5O_{15}$ (Ln: Y, Ce, Sm, Eu, La, Gd, Tb, Dy, Ho, Bi) crystals and solid solutions thereof. The above-mentioned perovskite type crystals particularly preferably include one or more selected from the group consisting of $RNbO_3$, $RTaO_3$, $(Bi_{0.5}, R_{0.5})TiO_3$ (R: Na, K), and $MTiO_3$ (M: Ca, Sr, Ba) crystals and solid solutions thereof.

The inorganic composition according to the present disclosure preferably has a dielectric constant of 500 or more, more preferably 650 or more, still more preferably 800 or more, and most preferably 900 or more, at a frequency of from 1 kHz to 100 kHz.

In the inorganic composition according to the present disclosure, a change rate of the dielectric constant relative to a temperature range from −50° C. to 350° C. at 1 kHz and/or 100 kHz is preferably 30% or less, more preferably 20% or less, still more preferably 15% or less, and most preferably 10% or less, in the temperature range from −50° C. to 350° C.

Note that, in the present disclosure, the dielectric constant and the dielectric loss are measured over a frequency of from 100 Hz to 1 MHz by using an LRC meter (4274A, manufactured by Keysight Technologies) or an impedance analyzer (for example, SI1260, manufactured by Solartron), and the values at 1 kHz or 100 kHz are used as the dielectric constant and the dielectric loss in the present disclosure.

If the inorganic composition according to the present disclosure is a dielectric ceramic, the inorganic composition has a high relative dielectric constant and the dielectric constant has good temperature characteristics in a wide temperature range from −50° C. to 350° C. Therefore, the inorganic composition according to the present disclosure can be suitably used as a high-temperature condensor. Specific examples of the high-temperature condensor include electronic components used in high-temperature environments, such as electronic components used for operating power devices including SiC or GaN as a base material, which are anticipated as vehicle-mounted devices, or for removing noise in the engine room of automobiles.

Further, a dielectric body using the inorganic composition according to the present disclosure is a ferroelectric body and is also expected to have good piezoelectric characteristics (for example, piezoelectric constant: d, electromechanical coupling coefficient: k), and thus, can also be suitably used for a piezoelectric element.

<Manufacturing Method>

A method of manufacturing the inorganic composition according to the present disclosure will be described.

Firstly, raw materials for each component constituting the inorganic composition according to the present disclosure are prepared. The raw materials of each component are not particularly limited, and may be appropriately selected from oxides and composite oxides of the components mentioned above, or various types of compounds resulting in these oxides or composite oxides obtained by firing, such as carbonates, nitrates, hydroxides, fluorides, and organic metal compounds.

Next, the prepared raw materials are weighed and mixed so as to obtain a predetermined composition ratio, to acquire a raw material mixture. Examples of the mixing method include wet mixing using a ball mill and dry mixing using a dry mixer.

The obtained raw material mixture may be granulated by adding a binder resin, to form a granulated product, or may be added with a binder resin or a solvent to form a paste to obtain a slurry. Further, the raw material mixture may be calcined before being formed into the granulated product or the slurry.

A method for forming the granulated product or the slurry is not particularly limited, but examples thereof include a sheet method, a printing method, dry forming, wet forming, and extrusion forming. For example, if dry forming is employed, the granulated product is filled in a mold and then compressed and pressed to obtain a formed body. The shape of the formed body is not particularly limited and may be appropriately determined according to application.

The obtained formed body can be fired, as needed, by any method including pressureless sintering, hot-pressing sintering, hot isostatic pressing sintering, spark plasma sintering, and microwave sintering, to obtain a ceramic dielectric body. The firing conditions may be appropriately determined according to the firing method, composition, and the like, but the firing temperature is preferably from 800° C. to 1400° C., and the holding time is preferably from several minutes to 24 hours.

The fired ceramic dielectric body may be heat-treated in air, oxygen, or a reducing atmosphere, as needed. The heat treatment reduces defects and improves the dielectric properties of the dielectric body. The temperature of the heat treatment is preferably in a range from 700° C. to 1200° C., and the treatment time is preferably in a range from 1 to 24 hours.

The ceramic dielectric body including the inorganic composition according to the present disclosure thus manufactured is suitably used for electronic components such as condensors.

In the above, a method for producing a ceramic dielectric body including a disk-shaped inorganic composition according to the present disclosure is described. However, ceramic condensors for forming the dielectric layers of multilayer type electronic components can also be produced by the green sheet method or the like. That is, powder of the dielectric body according to the present disclosure is formed into a paste, dielectric green sheet layers are formed on a carrier film by a doctor blade method or the like, and a paste for an internal electrode layer is printed on the dielectric green sheet layers in a predetermined pattern. After that, the printed green sheet layers are peeled one by one and then laminated, and then, the laminated printed green sheet layers are applied with pressure to be integrally formed, and the resultant product is fired at a temperature of about 800° C. to 1200° C. to produce the ceramic condensor.

Further, the inorganic composition according to the present disclosure can be produced as a thin film dielectric body by using a normal thin film forming method. For example, the thin film dielectric body can be formed by using a vacuum vapor deposition method, a high frequency sputtering method, a pulsed laser deposition (PLD) method, a metal organic chemical vapor deposition (MOCVD) method, a metal organic decomposition (MOD) method, a sol-gel method, a hydrothermal method, and the like.

Therefore, the inorganic composition according to the present disclosure may be employed for electronic components such as single-plate condensors, may be employed for electronic components such as multilayer type condensors, and may be employed for thin-film electronic components. Alternatively, the inorganic composition according to the present invention may be employed for a piezoelectric element.

EXAMPLES

Hereinafter, the present disclosure will be described in more detail with reference to Examples, but the present disclosure is not limited to these Examples.

Production of Example 1-4

An inorganic composition containing oxide crystals including P and Nb was produced by spark plasma sintering according to the following procedure. Firstly, powders of $NH_4H_2PO_4$ and $Nb_2O_5$ as raw materials were blended at a predetermined ratio (P/Nb=0.11), filled into a polypot together with zirconia balls having a diameter of 2 mm and ethanol, mixed for 24 hours, and then, dried for 24 hours. The dried mixed powders were calcined at 1000° C. for 2 hours. The obtained calcined product was mixed, pulverized, and dried under conditions similar to that described above to obtain a dielectric powder including the inorganic composition. 4 g of this dielectric powder was taken, filled into a graphite die having an inner diameter of 20 mm, and heated at 1050° C. to 1200° C. for 5 to 12 minutes while being applied with pressure of 35 MPa in the vertical direction in a vacuum atmosphere by a spark plasma sintering device (SPS625, manufactured by Sumitomo Coal Mining Co., Ltd.), to obtain a disk-shaped dielectric body. After both sides of the obtained disk-shaped dielectric body were polished, the dielectric body was subjected to a heat treatment at 1000° C. for 4 hours while passing oxygen at 1 L/min, to be used as a sample for evaluating the physical properties. Table 1 shows the production conditions and various physical properties of the Examples.

FIG. 1 shows XRD-patterns of Examples 1 and 2. All diffraction peaks can be attributed to $PNb_9O_{25}$, and thus, it was clarified that the present ceramic dielectric body was formed of $PNb_9O_{25}$ crystals. Note that the XRD-patterns were measured using an X-ray diffractometer (manufactured by Philips, trade name: X'Pert-MPD).

Figure 2:
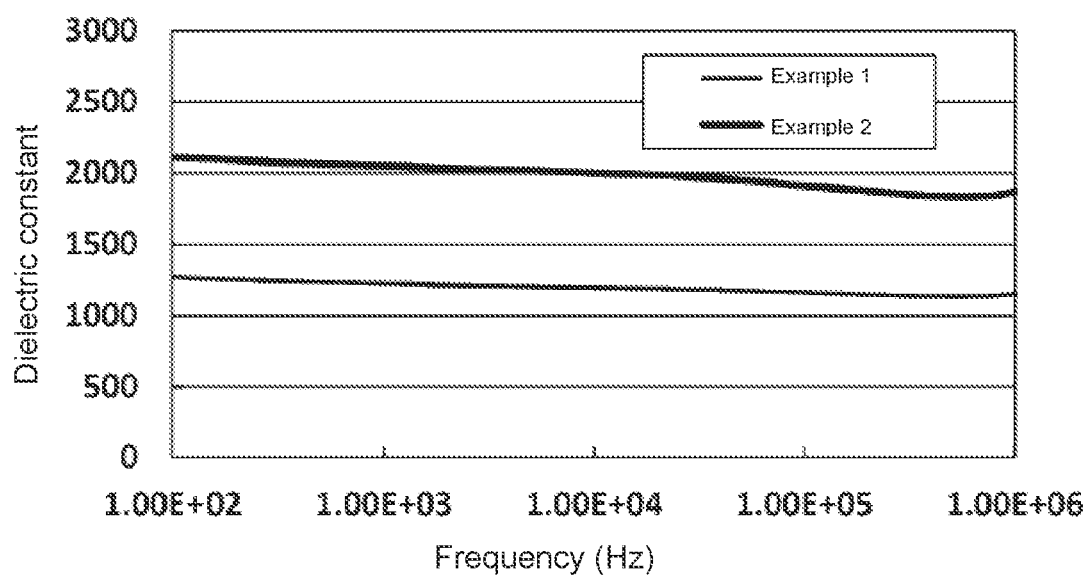
FIG. 2 is a graph showing a relationship between a dielectric constant and a frequency in Examples 1 and 2.

FIG. 2 shows the frequency dependence of the dielectric constant in Examples 1 and 2. Note that, after gold electrodes were vapor-deposited on both sides of the sample, the dielectric constant and the dielectric loss was measured at room temperature (25° C.) by using an impedance analyzer (SI1260, manufactured by Solartron). From FIG. 2, it can be understood that the dielectric constant is 900 or more in the frequency range (100 Hz to $10^6$ Hz) used for measurement and does not vary significantly with the frequency. Further, in checking the dielectric loss, the dielectric loss as small as 5% or less was found in the above-mentioned frequency range.

Figure 3:
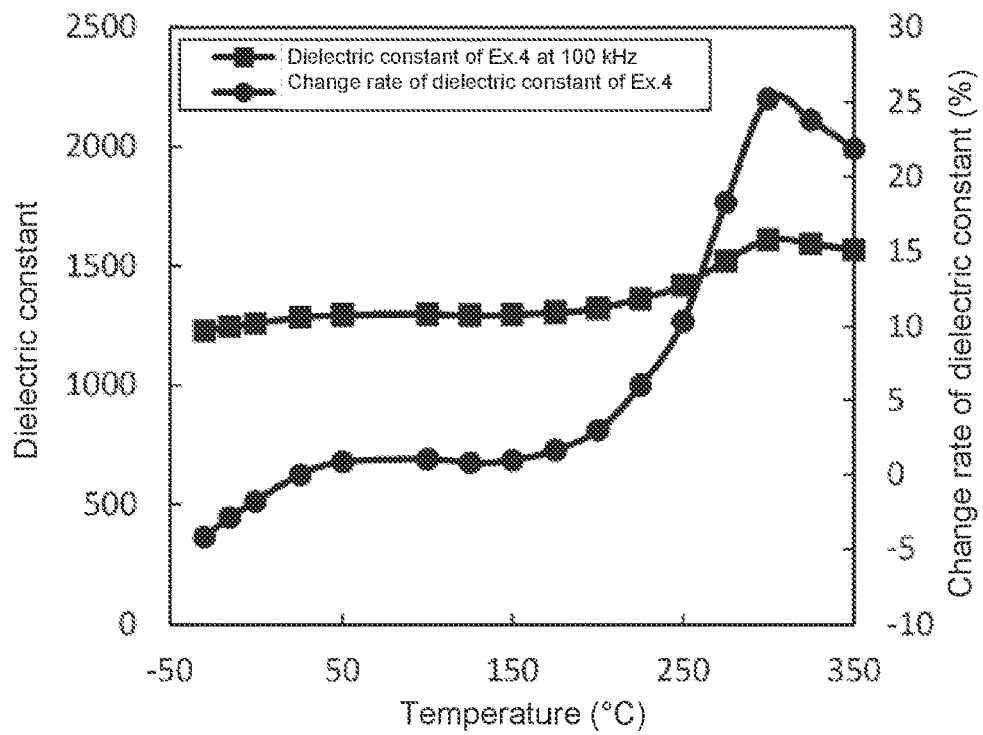
FIG. 3 is a graph showing a relationship between a dielectric constant and a temperature in Example 4.

The temperature dependence of the dielectric properties was measured by using an LCR meter in a temperature range from −30° C. to 350° C. over frequencies from 100 Hz to 100 kHz. FIG. 3 shows measurement results for Example 4 as a representative example. In FIG. 3, the dielectric constant at a frequency of 100 kHz is plotted relative to a temperature. From FIG. 3, it can be understood that the dielectric constant of the dielectric body according to the present disclosure has high values and does not vary significantly in a temperature range from −30° C. to 350° C.

To calculate a change rate ($\varepsilon_T$) of the dielectric constant relative to a temperature, the following equation was used to obtain how much the dielectric constant varies at each temperature, using the dielectric constant at 25° C. as a reference.

$\varepsilon_T$(%)=[(dielectric constant at target temperature−dielectric constant at 25° C.)/dielectric constant at 25° C.]×100%

The change rate ($\varepsilon_T$) of the dielectric constant of Example 4 obtained from the above-mentioned equation is shown in FIG. 3. From FIG. 3, it can be understood that the change rate of the dielectric constant was 25% or less in the temperature range from −30° C. to 350° C., and 10% or less in a temperature range from −30° C. to 250° C.

TABLE 1

| | | Examples | | | |
|---|---|---|---|---|---|
| | | 1 | 2 | 3 | 4 |
| Composition | | 0.1 $P_2O_5$ and 0.9 $Nb_2O_5$ | 0.1 $P_2O_5$ and 0.9 $Nb_2O_5$ | 0.1 $P_2O_5$ and 0.9 $Nb_2O_5$ | 0.1 $P_2O_5$ and 0.9 $Nb_2O_5$ |
| Sintering conditions | Temperature (° C.) | 1100 | 1150 | 1130 | 1150 |
| | Time (Min.) | 10 | 10 | 5 | 5 |
| Annealing conditions (in oxygen) | Temperature (° C.) | 1100 | 1100 | 1000 | 1000 |
| | Time (h) | 4 | 4 | 4 | 4 |
| Crystal phase | | $PNb_9O_{25}$ | $PNb_9O_{25}$ | $PNb_9O_{25}$ | $PNb_9O_{25}$ |
| Dielectric constant (100 kHz) | | 1162 | 1916 | 1205 | 1286 |
| Dielectric loss (100 kHz) | | 0.03 | 0.05 | 0.04 | 0.04 |

Figure 4:
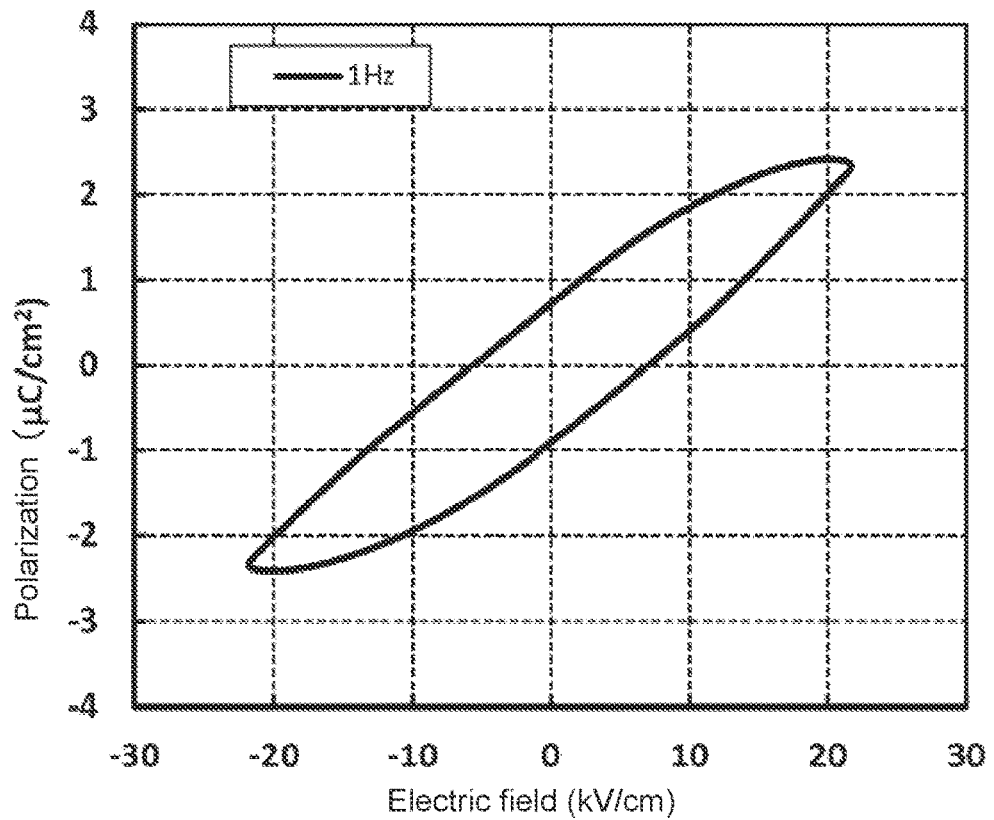
FIG. 4 is a graph showing a hysteresis curve of Example 4.

FIG. 4 shows an electric field-polarization curve of Example 4. From FIG. 4, it was clarified that the present dielectric body was a ferroelectric body.

Production of Example 5

An inorganic composition containing oxide crystals including Ge and Nb was produced by a spark plasma sintering method according to the following procedure. Firstly, powders of $GeO_2$ and $Nb_2O_5$ as raw materials were blended at a predetermined ratio (Ge/Nb=0.11), filled into a polypot together with zirconia balls having a diameter of 2 mm and ethanol, mixed for 24 hours, and then, dried for 24 hours. The dried mixed powders were calcined at 950° C. for 2 hours. The obtained calcined product was mixed, pulverized, and dried under conditions similar to that described above to obtain a dielectric powder including the inorganic composition. 2.5 g of this dielectric powder was taken, filled into a graphite die having an inner diameter of 15 mm, and heated at 900° C. for 5 minutes while being applied with pressure of 50 MPa in the vertical direction in a vacuum atmosphere by a spark plasma sintering device, to obtain a disk-shaped dielectric body. After both sides of the obtained disk-shaped dielectric body were polished, the dielectric body was subjected to a heat treatment at 850° C. for 4 hours while passing oxygen at 2 L/min, to be used as a sample for evaluating the physical properties.

From the analysis of the XRD-pattern, it is assumed that a $GeNb_{19.144}O_{50}$ crystal phase or a $GeNb_9O_{25}$ crystal phase is produced. The diffraction peaks of $GeNb_{19.144}O_{50}$ and $GeNb_9O_{25}$ overlap, and thus, the two crystals may coexist at the same time.

Figure 5:
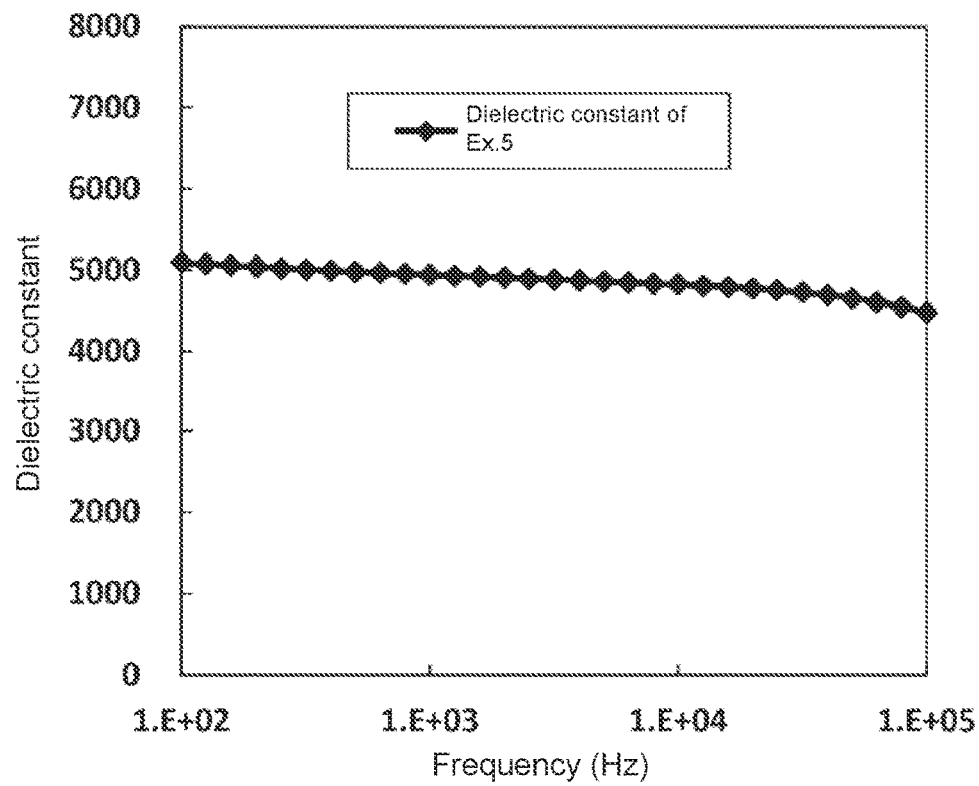
FIG. 5 is a graph showing a relationship between a dielectric constant and a frequency in Example 5.
Figure 6:
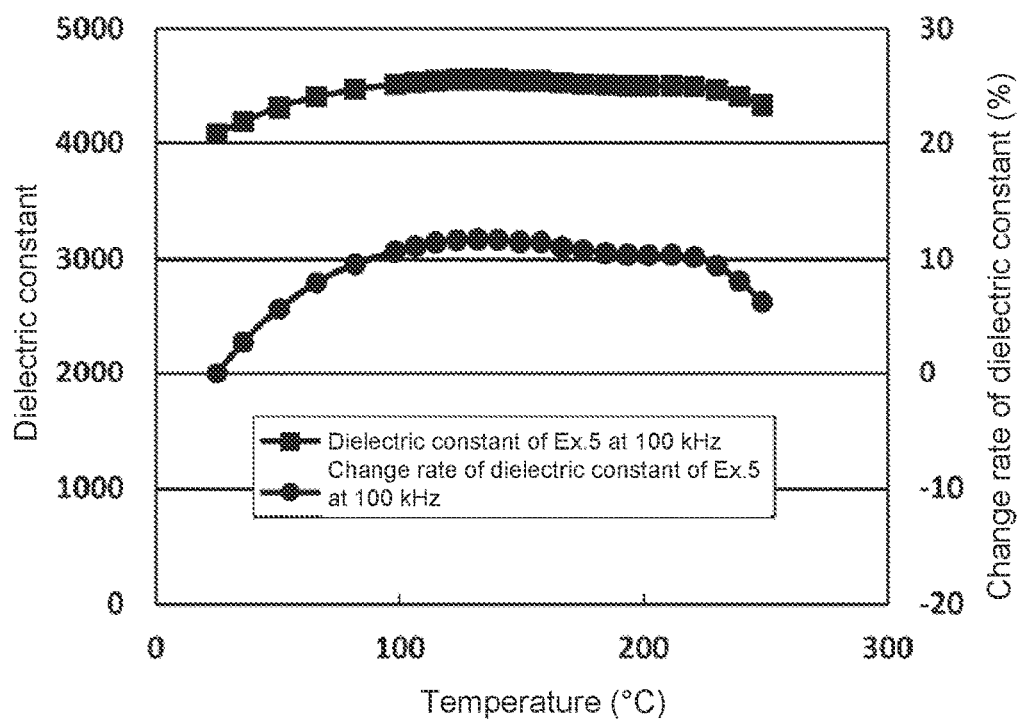
FIG. 6 is a graph showing a relationship between a dielectric constant and a temperature in Example 5.

FIG. 5 shows the frequency dependence of the dielectric constant in Example 5. It can be understood that the dielectric constant is as high as 4000 to 5000 in the frequency range used for measurement. From the relationship between the dielectric properties and the temperature characteristics in FIG. 6, it can be confirmed that the dielectric constant varies little and the change rate of the dielectric constant is 15% or less at high temperatures of 250° C. or higher.

Production of Example 6

An inorganic composition containing oxide crystals including Ge and Nb was produced by a normal sintering method according to the following procedure. Firstly, powders of $GeO_2$ and $Nb_2O_5$ as raw materials were blended at a predetermined ratio (Ge/Nb=0.11), filled into a polypot together with zirconia balls having a diameter of 2 mm and ethanol, mixed for 24 hours, and then, dried for 24 hours. The dried mixed powders were calcined at 950° C. for 2 hours. The obtained calcined product was mixed, pulverized, and dried under conditions similar to that described above to obtain a dielectric powder including the inorganic composition. 2.0 g of this dielectric powder was taken, filled into a mold having an inner diameter of 20 mm, molded into pellets by a biaxial press, and then sintered in air at 1170° C. for 4 hours in an electric furnace. The XRD of the obtained disk-shaped dielectric body was measured, and then, the dielectric constant was measured.

The XRD-pattern was the same as in Example 5, and thus, it was clarified that the dielectric body had a similar crystal phase.

Figure 7:
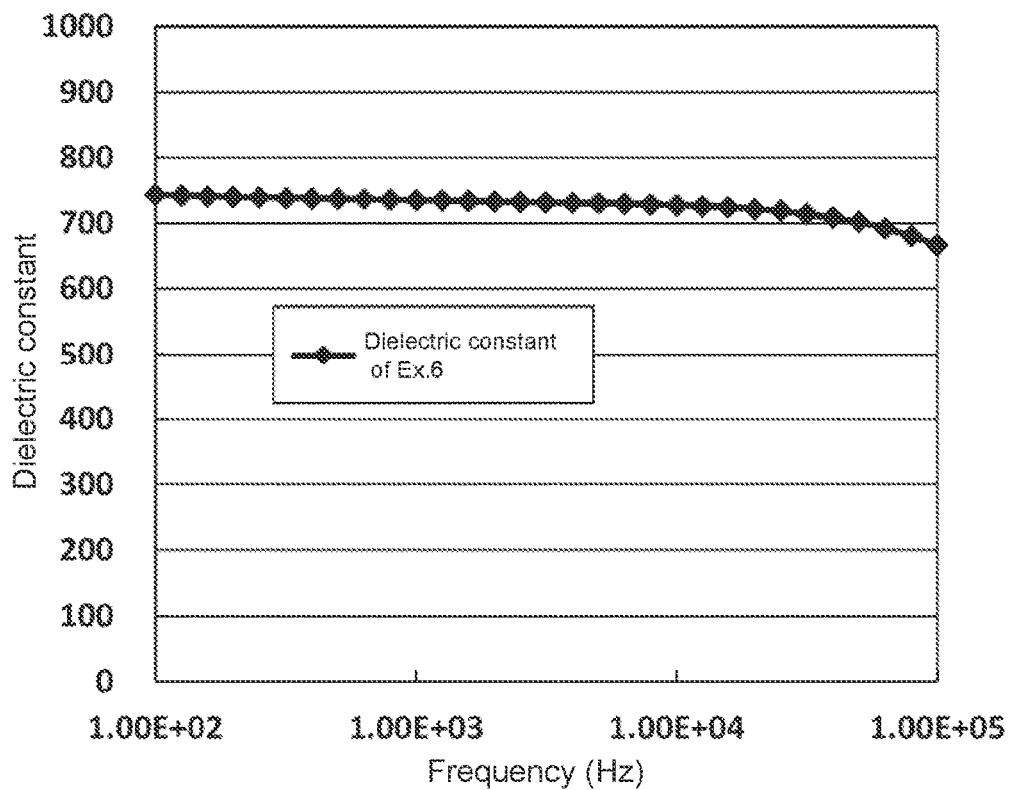
FIG. 7 is a graph showing a relationship between a dielectric constant and a frequency in Example 6.
Figure 8:
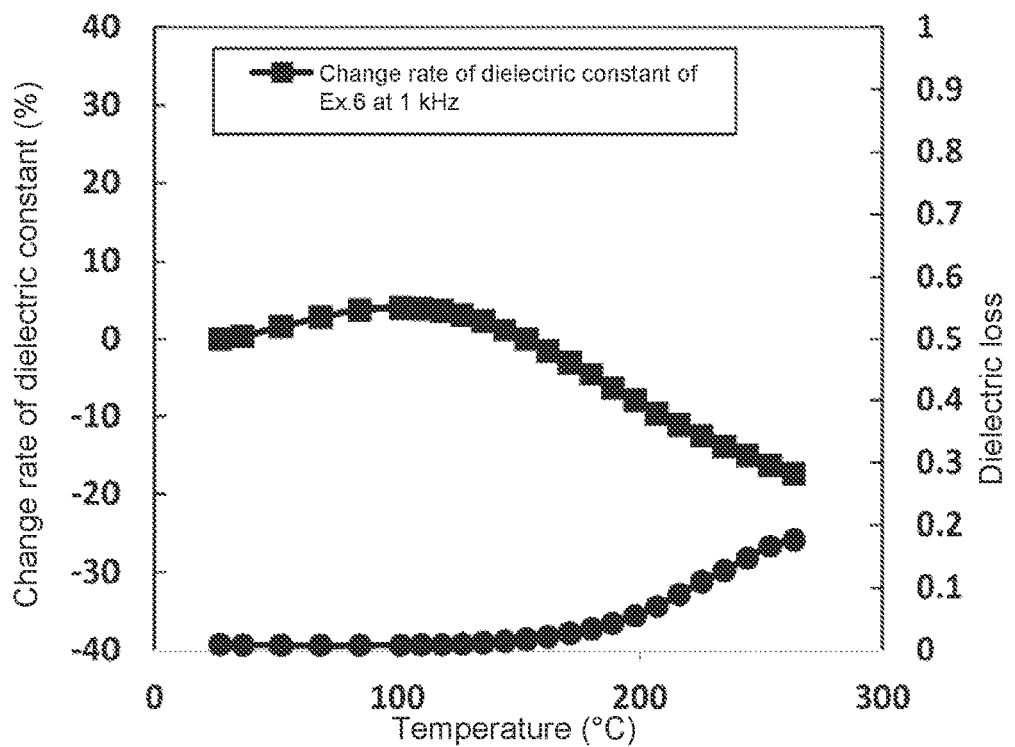
FIG. 8 is a graph showing a relationship between a dielectric constant and a temperature in Example 6.

FIG. 7 shows the frequency dependence of the dielectric constant in Example 6. It can be understood that the dielectric constant is substantially constant at about 700 in the frequency range used for measurement. From the relationship between the dielectric properties and the temperature characteristics in FIG. 8, it was confirmed that the change rate of the dielectric constant was as low as 15% or less and the dielectric loss was 0.5 or less at high temperatures of 200° C. or higher.

What is claimed is:

1. An inorganic substance containing an oxide crystal including A and M (the A being one or more of P, Ge, and V, and the M being one or more of Nb and Ta),
    wherein a molar ratio of the A and the M is in a range from 0.01 to 1.00, and a dielectric constant is 500 or more;
    wherein a change rate of the dielectric constant relative to a temperature range from −50° C. to 350° C. is 30% or less.

2. An inorganic substance containing an oxide crystal including A and M (the A being one or more of P, Ge, and V, and the M being one or more of Nb and Ta), wherein a molar ratio of the A and the M is in a range from 0.01 to 1.00, and a dielectric constant is 500 or more;
    wherein the oxide crystal is one or more of $PNb_9O_{25}$, $P_{2.5}Nb_{18}O_{50}$, $GeNb_9O_{25}$, $GeNb_{18}O_{47}$, $GeNb_{19.144}O_{50}$, $VNb_9O_{25}$, $VNb_9O_{24.9}$, $PTa_9O_{25}$, $GeTa_9O_{25}$, $VTa_9O_{25}$, and solid solutions thereof.

3. A dielectric body including the inorganic substance according to claim 1.

4. The dielectric body according to claim 3, wherein the dielectric body is a ferroelectric body.

5. A condenser including the dielectric body according to claim 3.

6. A condenser including the dielectric body according to claim 4.

* * * * *